(12) United States Patent
Rajan et al.

(10) Patent No.: US 9,529,699 B2
(45) Date of Patent: Dec. 27, 2016

(54) SYSTEM AND METHOD FOR TEST DATA GENERATION AND OPTIMIZATION FOR DATA DRIVEN TESTING

(71) Applicant: Wipro Limited, Bangalore (IN)

(72) Inventors: Anoop Rajan, Bellevue, WA (US); Sourav Bhattacharya, Fountain Hills, AZ (US)

(73) Assignee: Wipro Limited, Bangalore (IN)

( * ) Notice: Subject to any disclaimer, the term of this patent is extended or adjusted under 35 U.S.C. 154(b) by 264 days.

(21) Appl. No.: 13/950,082

(22) Filed: Jul. 24, 2013

(65) Prior Publication Data

US 2014/0365830 A1    Dec. 11, 2014

(30) Foreign Application Priority Data

Jun. 11, 2013   (IN) .......................... 2540/CHE/2013

(51) Int. Cl.
*G06F 11/36* (2006.01)

(52) U.S. Cl.
CPC ....... *G06F 11/3684* (2013.01); *G06F 11/3664* (2013.01); *G06F 11/3672* (2013.01); *G06F 11/3668* (2013.01); *G06F 11/3696* (2013.01)

(58) Field of Classification Search
CPC ............. G06F 11/36; G06F 11/3664–11/3672; G06F 11/3684; G06F 11/3688; G06F 11/3692
See application file for complete search history.

(56) References Cited

U.S. PATENT DOCUMENTS

| | | | | |
|---|---|---|---|---|
| 4,617,663 A | * | 10/1986 | Lake et al. ..................... | 714/736 |
| 5,124,989 A | * | 6/1992 | Padawer et al. ........... | 714/38.13 |
| 5,159,600 A | * | 10/1992 | Chintapalli ......... | G06F 11/3684 702/123 |
| 5,357,452 A | * | 10/1994 | Pio-di-Savoia et al. ...... | 702/108 |
| 6,002,869 A | * | 12/1999 | Hinckley ............ | G06F 11/3696 714/35 |

(Continued)

OTHER PUBLICATIONS

Zambelich, K., Totally Data-Driven Automated Testing, 1998, 17 pages, [retrieved on Oct. 28, 2016], Retrieved from the Internet: <URL:http://www.oio.de/public/softwaretest/Totally-Data-Driven-Automated-Testing.pdf>.*
The Complete Guide to Data-Driven Testing, TestComplete by Smartbear, 2012, 16 pages, [retrieved on Oct. 28, 2016], Retrieved from the Internet: <URL:http://www2.smartbear.com/rs/smartbear/images/SmartBear-Data-Driven-Testing-eBook.pdf>.*

(Continued)

*Primary Examiner* — Geoffrey St Leger
(74) *Attorney, Agent, or Firm* — LeClairRyan, a Professional Corporation (57) ABSTRACT

A system, medium and method for automatically generating test data to be applied to test a target software code is disclosed. Input parameter data is received from a user via a displayed user interface, wherein the input parameter data is directed to a user selected data type, the data type being a Boolean, string, or integer. One or more preestablished stored testing algorithms is automatically selected based on the user selected data type and one or more values are applied to the selected one or more preestablished stored testing algorithms in accordance with the user selected data type. At least one set of test data from the one or more identified applicable testing algorithms is automatically generated, wherein the at least one set of test data generated from the identified testing algorithms can be used as inputs for testing the target software code.

21 Claims, 9 Drawing Sheets

(56) References Cited

U.S. PATENT DOCUMENTS

| | | | |
|---|---|---|---|
| 6,038,378 A * | 3/2000 | Kita et al. | 714/38.11 |
| 6,308,146 B1 * | 10/2001 | La Cascia et al. | 703/22 |
| 6,993,748 B2 | 1/2006 | Schaefer | |
| 7,222,265 B1 * | 5/2007 | LeSuer et al. | 714/38.1 |
| 7,299,382 B2 | 11/2007 | Jorapur | |
| 7,409,619 B2 | 8/2008 | El Far et al. | |
| 7,562,274 B2 | 7/2009 | Chorn et al. | |
| 7,809,725 B1 * | 10/2010 | Vasilik | G06Q 10/00 707/736 |
| 8,347,267 B2 | 1/2013 | Givoni et al. | |
| 9,032,360 B1 * | 5/2015 | Cohen | G06F 8/20 717/103 |
| 2003/0014734 A1 * | 1/2003 | Hartman et al. | 717/125 |
| 2004/0060039 A1 * | 3/2004 | Fujikawa et al. | 717/124 |
| 2005/0144529 A1 * | 6/2005 | Gotz | G06F 11/3684 714/38.1 |
| 2005/0160321 A1 * | 7/2005 | Cleaveland et al. | 714/38 |
| 2005/0256665 A1 * | 11/2005 | Hartmann et al. | 702/121 |
| 2006/0136876 A1 * | 6/2006 | Melamed | G06F 11/3672 717/124 |
| 2006/0248405 A1 * | 11/2006 | Ponczak | G06F 11/3664 714/38.1 |
| 2006/0253839 A1 * | 11/2006 | Avritzer | G06F 11/3684 717/124 |
| 2006/0271322 A1 * | 11/2006 | Haggerty | 702/108 |
| 2007/0094189 A1 * | 4/2007 | Yamamoto | G06F 11/3684 706/45 |
| 2007/0168967 A1 | 7/2007 | Chopra et al. | |
| 2008/0066057 A1 * | 3/2008 | Aoyama et al. | 717/124 |
| 2008/0147689 A1 * | 6/2008 | Uehara et al. | 707/100 |
| 2009/0287958 A1 * | 11/2009 | Bhatt et al. | 714/26 |
| 2011/0123973 A1 * | 5/2011 | Singh | G06F 11/3668 434/322 |
| 2011/0178775 A1 * | 7/2011 | Schoning et al. | 702/190 |
| 2012/0017119 A1 * | 1/2012 | Ghosh et al. | 714/38.1 |
| 2012/0246674 A1 | 9/2012 | Burt et al. | |
| 2013/0042145 A1 | 2/2013 | Pasupuleti et al. | |
| 2014/0157236 A1 * | 6/2014 | Campbell | G06F 11/3684 717/124 |
| 2014/0215439 A1 * | 7/2014 | Krishnan | G06F 11/3664 717/124 |

OTHER PUBLICATIONS

Malhotra R., et al., "An Adequacy Based Test Data Generation Technique Using Genetic Algorithms", Journal of Information Processing Systems, Jun. 2011, vol. 7, No. 2, pp. 363-384.

Brottier E., et al., "Metamodel-based Test Generation for Model Transformations: an Algorithm and a Tool", 17th International Symposium on Software Reliability Engineering (ISSRE'06), 2006, pp. 1-10.

Korel, B., "Automated Software Test Data Generation", IEEE Transactions of Software Engieneering, Aug. 1990, vol. 16, No. 8, pp. 870-879.

Tanuska P., et al., "Data-Driven Scenario Test Generation for Information Systems", International Journal of Computer Theory and Engineering, Aug. 2011, vol. 3, No. 4, pp. 565-570.

Smartbear, "Simplifying Data-Driven Testing With TestComplete's Automatic Data Generator", Dec. 5, 2010, <http://blog.smartbear.com/software-quality/bid/169959>.

Wipro, "WiBRATE™ Wipro's Bridging & Routing protocols Automated Test Environment", Testing as Managed Service (TMS)™, last accessed Feb. 10, 2014, <http://www.wipro.com/Documents/resource-center/library/WIbrate.pdf>.

Visual Studio, "How to: Create a Data-Driven Unit Test", Microsoft, Developer Network, 2013, <http://msdn.microsoft.com/en-us/library/ms182527.aspx>.

XPrime, "Data-Driven Test", xUnit Patterns, Feb. 2011, pp. 1-4, <http://xunitpatterns.com/Data-Driven%20Test.html>.

Smartbear, "Multi-Enviornment Support", SoapUI, SmartBear Software, Functional Tests, 2013, <www.soapui.org/Data-Driven-Testing/functional-tests.html>.

Ranorex, "Data driven test automation with Excel", Jul. 23, 2008, pp. 1-9, <http://www.ranorex.com/blog/data-driven-tes-automation-with-excel>.

Inflectra, "Fully Integrated with SpiraTest for Test Management", Rapise, Oct. 21, 2011, <http://inflectra.com/Rapise/Default.aspx>.

Nagle, C., "Test Automation Frameworks", Data Driven Test Automation Frameworks, Dec. 30, 2002, pp. 1-32, <http://safsdev.sourceforge.net/FRAMESDataDrivenTestAutomationFrameworks.htm>.

* cited by examiner

|  | Data Type | | |
| --- | --- | --- | --- |
| Algorithm Logic | Integer | String | Boolean |
| Null Data | Y | Y | Y |
| Min Value | Y | N | N |
| Max Value | Y | N | N |
| Bad Words | N | Y | N |

FIG. 3B

| Test Name | Description |
|---|---|
| Concurrency Testing | Concurrency Testing: Multi-user testing geared towards determining the effects of accessing the same application code, module or database records. It is usually done by performance engineers. |
| Dependency Testing | Dependency Testing: Testing type which examines an application's requirements for pre-existing software, initial states and configuration in order to maintain proper functionality. It is usually performed by testing teams. |
| Fault Injection Testing | Fault injection Testing: Element of comprehensive test strategy that enables the tester to concentrate on the manner in which the application under test is able to handle exceptions. It is performed by QA teams. |
| Fuzz Testing | Fuzz Testing: Software testing technique that provides invalid, unexpected, or random data to the inputs of a program - a special area of mutation testing. Fuzz testing is performed by testing teams. |
| Mutation Testing | Mutation Testing: Method of software testing which involves modifying programs' source code or byte code in small ways in order to test sections of the code that are seldom or never accessed during normal tests execution. It is normally conducted by testers. |
| Scalability Testing | Scalability Testing: Part of the battery of non-functional test which tests a software application for measuring its capability to scale up - be it the user load supported, the number of transactions, the data volume etc. It is conducted by the performance engineer. |
| Stress Testing | Stress Testing: Testing technique which evaluates a system or component at or beyond the limits of its specified requirements. It is usually conducted by the performance engineer. |

FIG. 4

| Test Name | Description |
|---|---|
| Boundary Value Testing | Boundary Value Testing: Software testing techique in which tests are designed to include representative of boundary values. It is performed by the QA testing teams. |
| Equivalence Partitioning Testing | Equivalence Partitioning Testing: Software testing technique that divides the input data of a software unit into partitions of data from which test cases can be derived. It is usually performed by the QA teams. |
| GUI Software Testing | GUI Software Testing: The process of testing a product that uses a graphical user interface, to ensure it meets its written specifications. This is normally done by the testing teams. |
| Interface Testing | Interface Testing: Testing conducted to evaluate whether systems or components pass data and control correctly to one another. It is usually performed by both testing and development teams. |
| Keyword-driven Testing | Keyword-driven Testing: Also known as table-driven testing or action-word testing, is a software testing methodology for automated testing that separates the test creation process into two distinct stages: a Planning Stage and an Implementation Stage. It can be used by either manual or automation testing teams. |
| Negative Testing | Negative Testing: Also known as "test to fail" - testing method where the tests' aim is showing that a component or system does not work. It is performed by manual or automation testers. |
| Orthogonal Array Testing | Orthogonal Array Testing: Systematic, statistical way of testing which can be applied in user interface testing, system testing, regression testing, configuration testing and performance testing. It is performed by the testing team. |

SYSTEM AND METHOD FOR TEST DATA GENERATION AND OPTIMIZATION FOR DATA DRIVEN TESTING

STATEMENT OF RELATED APPLICATION

The present application claims the benefit of priority based on India Patent Application Serial No. 2540/CHE/2013, filed in the India Patent Office on Jun. 11, 2013, in the name of inventors Anoop Rajan and Sourav Bhattacharya, entitled "System and Method for Test Data Generation and Optimization for Data Driven Testing", all commonly owned herewith.

FIELD

This technology generally relates to a system, non-transitory computer medium and method for test data generation and optimization for data driven testing.

BACKGROUND

Data driven testing (DDT) is a common and useful concept in software testing. In particular, DDT environments allow the user to provide test input into the software to be tested ("target software"). However, the user is expected to provide the actual test data that is to be input into the target software. Considering that a user must be an expert in programming languages, software engineering and application domain matters in coming up with test data to be used on the target software, it is a major challenge in DDT on how to generate the input test data in a cost-effective manner.

What is needed is a system and method which automatically generates test data in a DDT environment wherein established and preloaded algorithms directed to software engineering, programming language and business/use case specific test cases are leveraged such that only generic input values are, at a minimum, only provided by the user to generate relevant test data for execution on target software.

SUMMARY

In an aspect, a method for automatically generating test data to be applied to test a target software code is disclosed. The method comprises receiving, with a testing apparatus, input parameter data from a user via a displayed user interface, wherein the input parameter data is directed to a user selected data type, the data type being a Boolean, string, or integer. The method comprises selecting, with the testing apparatus, one or more preestablished stored testing algorithms based on the user selected data type. The method comprises applying one or more values to the selected one or more preestablished stored testing algorithms in accordance with user selected data type. The method comprises automatically generating, with the testing apparatus, at least one set of test data from the one or more identified applicable testing algorithms, wherein the at least one set of test data generated from the identified testing algorithms can be used as inputs for testing the target software code.

In an aspect, a non-transitory machine readable medium has stored thereon instructions for automatically generating test data to be applied to test a target software code. The medium comprises machine executable code which when executed by a processor of a testing apparatus, causes the processor to perform steps comprising receiving input parameter data from a user via a displayed user interface, wherein the input parameter data is directed to a user selected data type. The data type is a Boolean, string, or integer. The steps comprise selecting one or more preestablished stored testing algorithms based on the user selected data type; and applying one or more values to the selected one or more preestablished stored testing algorithms in accordance with user selected data type. The steps comprise automatically generating at least one set of test data from the one or more identified applicable testing algorithms, wherein the at least one set of test data generated from the identified testing algorithms can be used as inputs for testing the target software code.

In an aspect, a computer based testing apparatus configured to automatically generate test data to be applied to test a target software code is disclosed. The apparatus comprises a memory having stored thereon executable programmed instructions for automatically generating test data to be applied to test a target software code. The apparatus comprises a processor coupled to the memory that is configured to execute the programmed instructions which, when executed by the processor, causes the processor to perform steps. Such steps comprise receiving input parameter data from a user via a displayed user interface, wherein the input parameter data is directed to a user selected data type. The data type is a Boolean, string, or integer. The steps comprise selecting one or more preestablished stored testing algorithms based on the user selected data type; and applying one or more values to the selected one or more preestablished stored testing algorithms in accordance with user selected data type. The steps comprise automatically generating at least one set of test data from the one or more identified applicable testing algorithms, wherein the at least one set of test data generated from the identified testing algorithms can be used as inputs for testing the target software code.

In one or more aspects, one or more preestablished testing algorithms is associated with software engineering based algorithms, programming language and construct based algorithms and/or application domain and business case based algorithms.

In one or more aspect, at least one set of test data generated by the testing apparatus includes a plurality of sets of test data. A priority based parsing technique is performed on the plurality of sets of test data generated, wherein the parsing technique is associated with the received input configuration data. A reduced set of test data is generated based from the parsing technique, wherein the reduced set of test data can be used to test the target software code.

In one or more aspects, the input parameter data utilized in the parsing technique identifies whether a particular input parameter is mandatory or optional.

In one or more aspects, the input parameter data utilized in the parsing technique indicates that a particular input parameter is to have a required value to be included or removed from the generated sets of testing data.

BRIEF DESCRIPTION OF THE DRAWINGS

FIG. 4 illustrates a table representing a test data set pruning logic based on the selected input parameters in accordance with an aspect of the present disclosure;

FIG. 5 provides an exemplary list of algorithms and their applicability to each data type.

DETAILED DESCRIPTION

In general, the present disclosure is directed to a system and method which automatically generates test data in a DDT (data driven testing) environment. In particular, the system and method utilizes one or more libraries containing preestablished loaded algorithms directed to test cases in software engineering, programming language and business case specific test cases, wherein generic input values provided by the user are correlated or mapped to some or all of the algorithms that are found to be relevant for testing against the target software. The user input values are applied to the identified relevant algorithms to generate the test input data. The system and method utilizes reduction and optimization techniques to focus the quantity and quality of generated test data to be ultimately applied to the target software.

The system and method is advantageous as it allows generation of test cases beyond what a human domain expert would be able to provide using businesses cases. Additionally, the system and method allows the ability to generate test cases that capture the programming language and programming constructs' tips and experience from the preestablished and loaded programming language algorithms that are stored in one or more libraries. Further, the system and method allows the ability to generate test cases capturing software engineering specific expertise and experience by utilizing the preestablished software engineering algorithms that are contained in one or more libraries. Moreover, the system and method has the ability to combine, using cross product or any other user selected method, to create all possible test cases using the combination of the programming language, software engineering and business use case algorithms to thereby alleviate manual intervention and minimize human error. The system and method is also advantageous in that it has the ability to prioritize among test cases using mandatory or optional field delineations while also allowing the user to input must have values to reduce the number of generated test cases to be applied to the target software.

Figure 1:
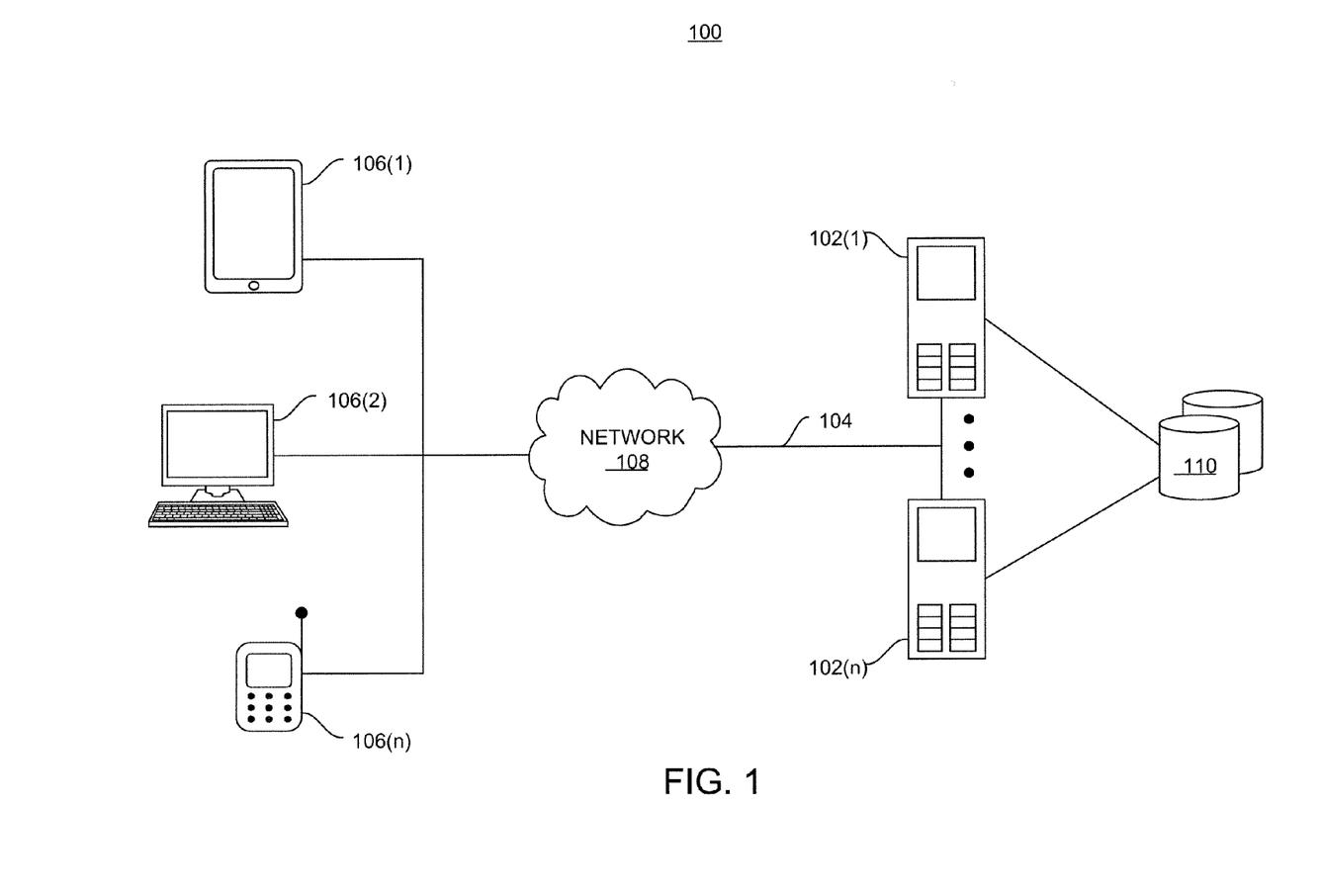
FIG. 1 illustrates a diagram of an example system environment that implements and executes an automated test generator software tool and associated method in accordance with an aspect of the present disclosure.

FIG. 1 illustrates a diagram of an example system environment that implements and executes an automated test generator software tool and associated method in accordance with an aspect of the present disclosure. In particular, the example system environment 100 includes a plurality of network devices such as one or more servers 102(1)-102(n) and one or more client devices 106(1)-106(n), although the environment 100 could include other numbers and types of devices in other arrangements. It should be noted that the term "network devices" can be referred to as encompassing one or more client devices, one or more servers, virtual machines, cloud computing devices and/or other components in the system 100.

The servers 102(1)-102(n) are connected to a local area network (LAN) 104 and the client devices 106(1)-106(n) are connected to a wide area network 108, whereby the one or more client devices 106(1)-106(n) communicate with the one or more servers 102(1)-102(n) via the wide area network 108 and LAN 104. The servers 102(1)-102(n) comprise one or more network devices or machines capable of operating one or more Web-based and/or non Web-based applications that may be accessed by other network devices (e.g. client devices, other servers) in the network 108. One or more servers may be front end Web servers, application servers, and/or database servers. Such data includes, but is not limited to Web page(s), image(s) of physical objects, user account information, and any other objects and information. It should be noted that the servers 102(1)-102(n) may perform other tasks and provide other types of resources.

One or more servers 102 may comprise a cluster of a plurality of servers which are managed by a network traffic management device (e.g. firewall, load balancer, web accelerator), gateway device, router, hub and the like. In an aspect, one or more servers 102(1)-102(n) may implement a version of Microsoft® IIS servers, RADIUS servers and/or Apache® servers, although other types of servers may be used and other types of applications may be available the on servers 102(1)-102(n). It should be noted that although the client device and/or server may be referred to herein in the plural, it is contemplated that only one client device and/or one server may be considered without being limiting to the language used herein. It should be understood that the particular configuration of the system 100 shown in FIG. 1 are provided for exemplary purposes only and is thus not limiting.

Client devices 106(1)-106(n) comprise computing devices capable of connecting to other computing devices, such as the servers 102(1)-102(n). Such connections are performed over wired and/or wireless networks, such as network 108, to send and receive data, such as for Web-based and non Web-based requests, receiving responses to requests and/or performing other tasks, in accordance with the novel processes described herein. Non-limiting and non-exhausting examples of such client devices 106(1)-106(n) include, but are not limited to, personal computers (e.g., desktops, laptops), mobile and/or smart phones, kiosks, tablet devices, PDAs and the like.

In an example, client devices 106(1)-106(n) may be configured to run a Web browser or other software module that provides a user interface for human users to interact with and access a testing module 210. In an example, the user can use the client device 106 to request resources and/or information, as well as submit instructions over the network 108 to the one or more servers 102(1)-102(n) via Web-based or non Web-based applications. One or more Web-based or non Web-based applications may accordingly run on the servers 102(1)-102(n) that provide the requested data to the client device 106(1)-106(n) and/or perform the requested instructions on behalf of the user. In an example, the client device 106 may be a smart phone, tablet, laptop or desktop computer which communicates with the servers 102(1)-102(n) via a software application embodied by the testing module 210.

Network 108 comprises a publicly accessible network, such as the Internet, which handles communication between the client devices 106(1)-106(n) and the servers 102(1)-102

(n). However, it is contemplated that the network 108 may comprise other types of private and public networks. Communications, such as requests from client devices 106(1)-106(n) and responses from servers 102(1)-102(n), preferably take place over the network 108 according to standard network protocols, such as the HTTP, UDP, and TCP/IP protocols and the like.

Further, it should be appreciated that the network 108 may include local area networks (LANs), wide area networks (WANs), direct connections and any combination thereof, as well as other types and numbers of network types. On an interconnected set of LANs or other networks, including those based on differing architectures and protocols, routers, switches, hubs, gateways, bridges, and other intermediate network devices may act as links within and between LANs, WANs and other networks to enable messages and other data to be sent and received between network devices. Also, communication links within and between LANs and other networks typically include twisted wire pair (e.g., Ethernet), coaxial cable, analog telephone lines, mobile cell towers, full or fractional dedicated digital lines including T1, T2, T3, and T4, Integrated Services Digital Networks (ISDNs), Digital Subscriber Lines (DSLs), wireless links including satellite links and other communications technologies.

LAN 104 may comprise one or more private and public networks which provide secured access to the servers 102(1)-102(n). These types of existing standardized messaging schemes used between financial institutions over WANs and LANs is well known and is not described in detail herein.

Figure 2A:
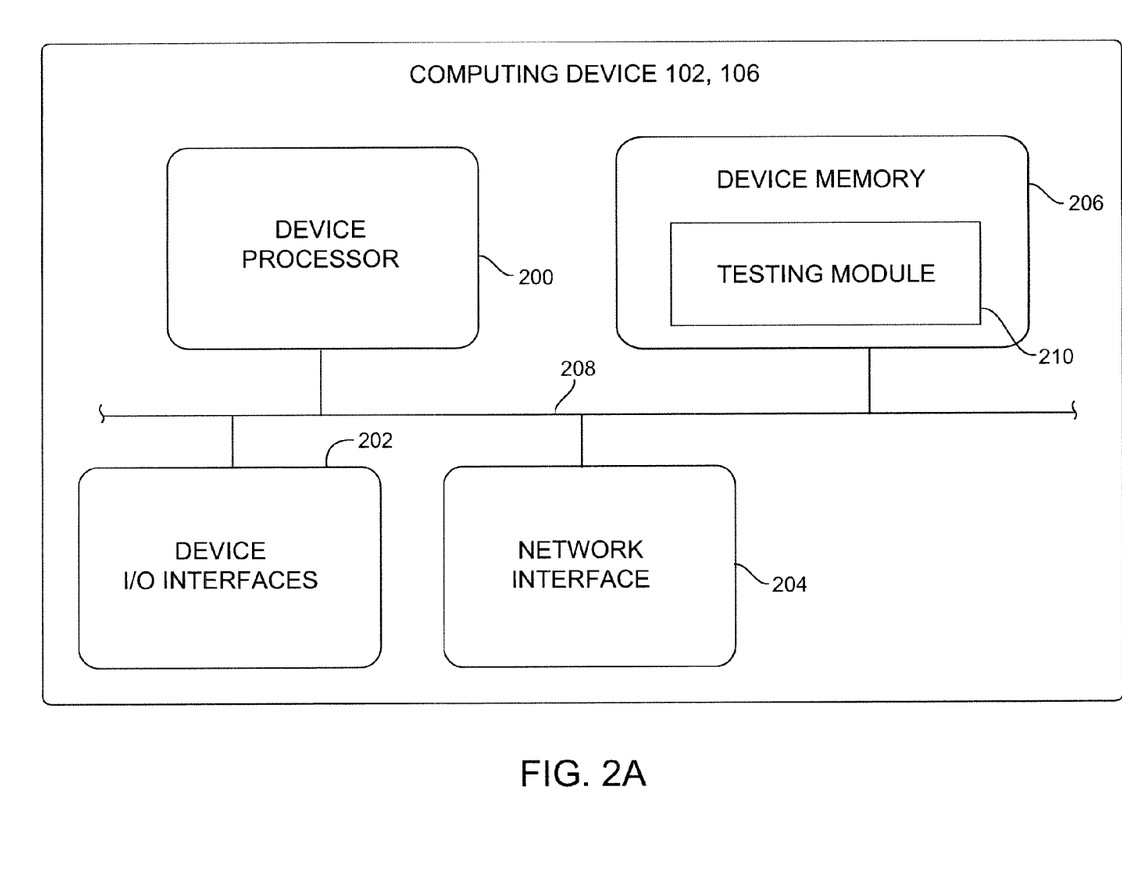
FIG. 2A illustrates a block diagram of a computing device shown in FIG. 1 in accordance with an aspect of the present disclosure.

FIG. 2A illustrates a block diagram of a computing device shown in FIG. 1 in accordance with an aspect of the present disclosure. The computing device is described herein as being one or more server devices 102, although it should be noted that the network device may alternatively be one or more client devices 106. The computing device 102, 106 includes one or more device processors 200, one or more device I/O interfaces 202, one or more network interfaces 204 and one or more device memories 206, all of which are coupled together by one or more buses 208. As will be discussed in more detail below, the computing device 102, 106 includes a testing module 210 stored in one or more memories 206. It should be noted that the computing device 102, 106 could include other types and numbers of components.

Device processor 200 comprises one or more microprocessors configured to execute computer/machine readable and executable instructions stored in the respective local device memory 206 or in a remote device memory (not shown). Such instructions are implemented by the processor 200 to perform one or more functions described below. It is understood that the processor 200 may comprise other types and/or combinations of processors, such as digital signal processors, micro-controllers, application specific integrated circuits ("ASICs"), programmable logic devices ("PLDs"), field programmable logic devices ("FPLDs"), field programmable gate arrays ("FPGAs"), and the like. The processor 200 is programmed or configured to execute the process in accordance with the teachings as described and illustrated herein of the novel system and method described.

Device I/O interfaces 202 comprise one or more user input and output device interface mechanisms. The interface may include a computer keyboard, touchpad, touchscreen, mouse, display device, and the corresponding physical ports and underlying supporting hardware and software to enable communications with other network devices in the system 100. Such communications include, but are not limited to, accepting user data input and providing output information to a user, programming, accessing one or more memory devices and administering one or more functions to be executed by the corresponding device and the like.

Network interface 204 comprises one or more mechanisms that enable the computing device 102, 106 to engage in TCP/IP or other communications over the LAN 104 and network 108. However, it is contemplated that the network interface 204 may be constructed for use with other communication protocols and types of networks. Network interface 204 is sometimes referred to as a transceiver, transceiving device, or network interface card (NIC), which transmits and receives network data packets over one or more networks, such as LAN 104 and network 108.

In an example where the network device includes more than one device processor 200 (or a processor 200 has more than one core), each processor 200 (and/or core) may use the same single network interface 204 or a plurality of network interfaces 204 to communicate with other network devices. Further, the network interface 204 may include one or more physical ports, such as Ethernet ports, to couple its respective device with other network devices in the system 100. Moreover, the network interface 204 may include certain physical ports dedicated to receiving and/or transmitting certain types of network data, such as device management related data for configuring the respective device, and the like.

Bus 208 may comprise one or more internal device component communication buses, links, bridges and supporting components, such as bus controllers and/or arbiters. The bus 208 enables the various components of the device 102, such as the processor 200, device I/O interfaces 202, network interface 204, and device memory 206 to communicate with one another. However, it is contemplated that the bus 208 may enable one or more components of its respective network device to communicate with components in other devices as well. Example buses 208 include HyperTransport, PCI, PCI Express, InfiniBand, USB, Firewire, Serial ATA (SATA), SCSI, IDE and AGP buses. However, it is contemplated that other types and numbers of buses 208 may be used, whereby the particular types and arrangement of buses 208 will depend on the particular configuration of the network device 102 which houses the bus 208.

Device memory 206 comprises non-transitory computer readable media, namely computer readable or processor readable storage media, which are examples of machine-readable storage media. Computer readable storage/machine-readable storage media may include volatile, nonvolatile, removable, and non-removable media implemented in any method or technology for storage of information. Such storage media stores computer readable/machine-executable instructions, data structures, program modules and components, or other data, which may be obtained and/or executed by one or more processors, such as device processor 200. Such stored instructions allow the processor to perform actions, including implementing an operating system for controlling the general operation of the computing device 102, 106, and in particular the testing module 210, to perform one or more portions of the novel processes described below.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Such desired information includes data and/or computer/machine-executable instructions and which can be accessed by the computing device 102, 106.

Figure 2B:
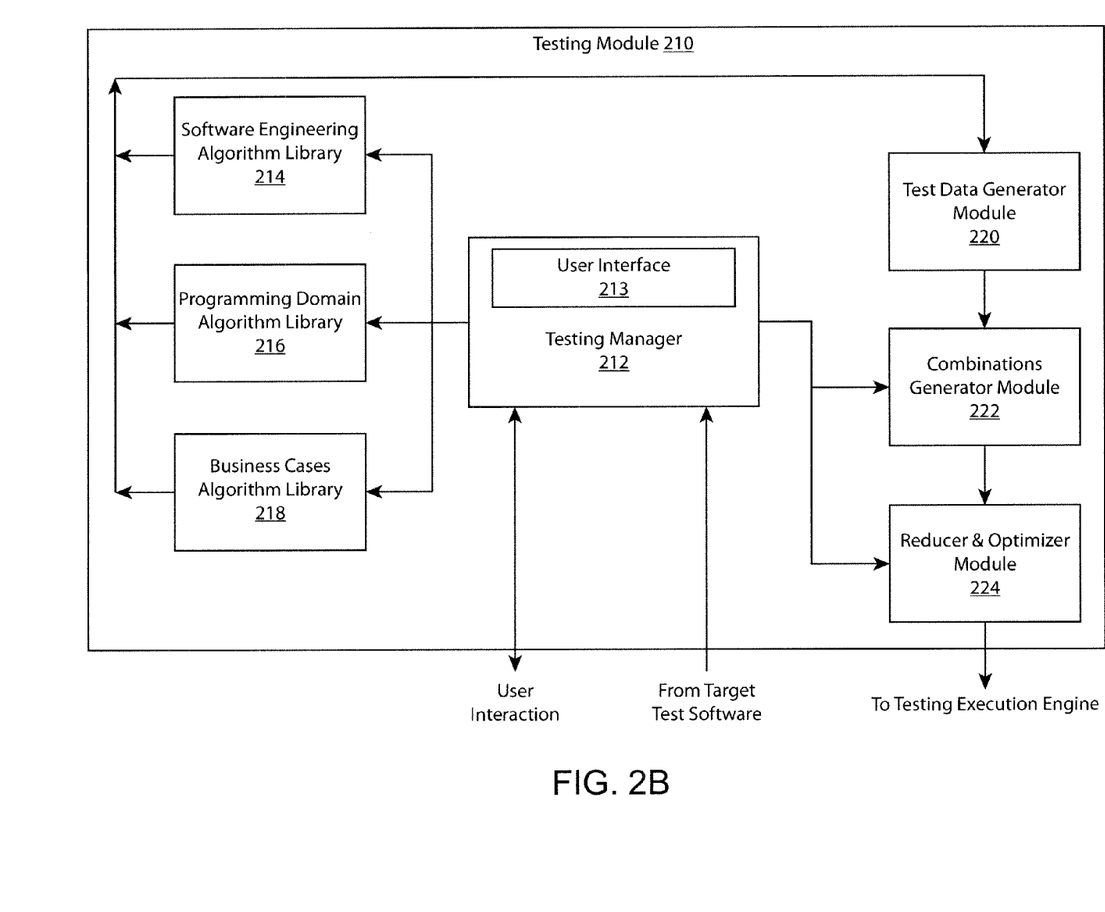
FIG. 2B illustrates a block diagram of the testing module in accordance with an aspect of the present disclosure.

FIG. 2B illustrates a block diagram of the testing module in accordance with an aspect of the present disclosure. The testing module 210 is configured to automatically generate test data inputs which would be provided to a testing execution engine 99 which performs the testing, using the generated test data inputs, into a target test software 98. The target test software can be any software, web services API or other platform type.

As shown in FIG. 2B, the testing module 210 includes a testing manager 212, a user interface module 213, a software engineering algorithm library 214, a programming domain algorithm library 216, a business cases algorithm library 218, a test data generator module 220, a combinations generator module 222, and a reducer/optimizer module 224. It should be noted that the number and types of components shown in FIG. 2B are exemplary and thus are not limited to what is shown in FIG. 2B.

The testing manager 212 manages the overall operation of the testing module 210, such as communicating with a user interface 213, algorithm libraries 214-218, combination generator module 222 and reducer and optimizer module 224. In particular, the testing manager 212 communicates with a user via the user interface 213 to allow the user to create/update a testing profile. Additionally, as will be described in more detail below, the user interface 213 allows the user to input generic input parameters which are ultimately used by the testing module to automatically generate test data which is provided to the testing execution engine 99. In addition, the user interface manager 212 is also configured to display output results provided to it from the target software 98 after the test has been run on the target software.

Figure 3A:
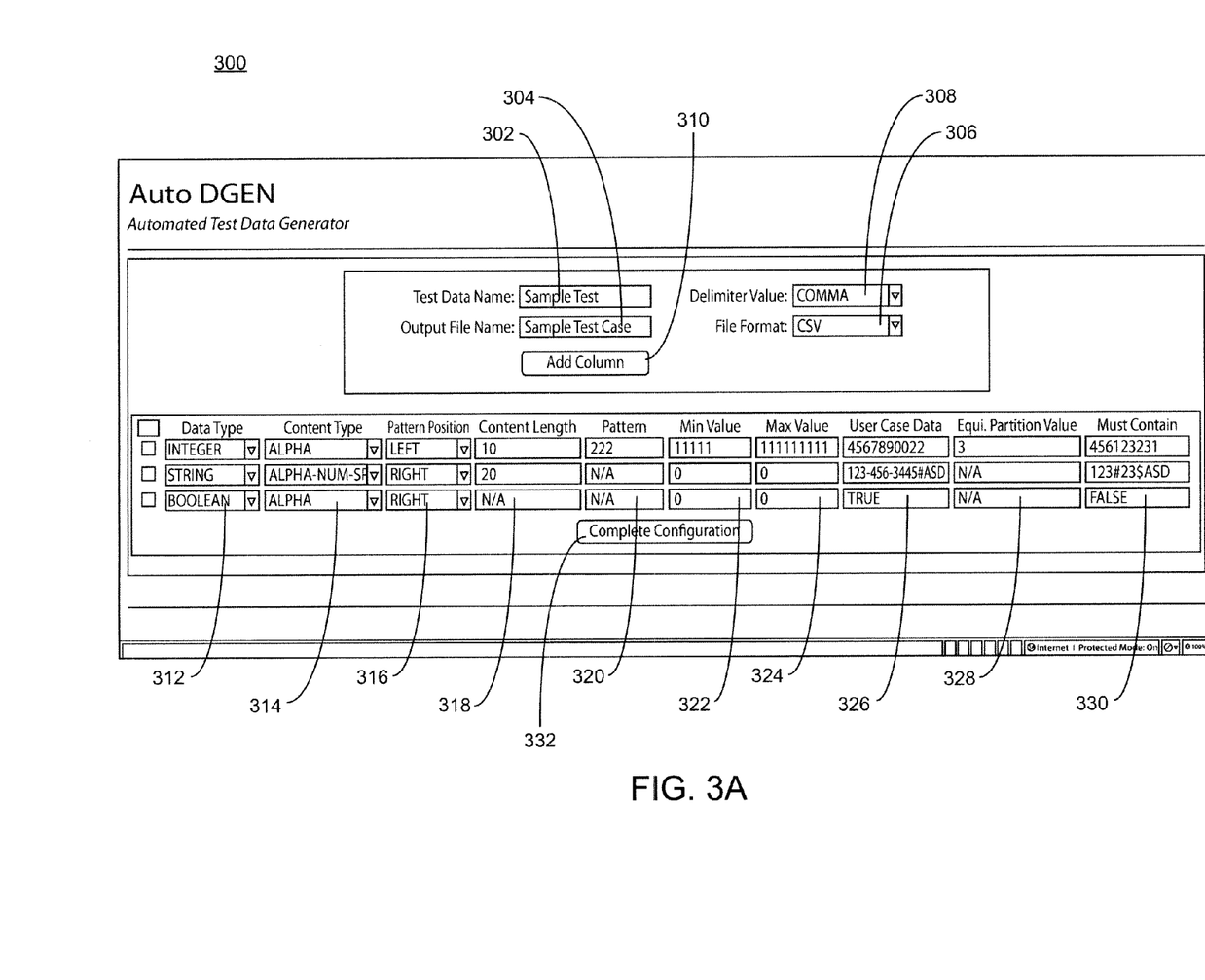
FIG. 3A illustrates a screen shot of an example user interface handled by the user interface manager in accordance with an aspect of the present disclosure.

FIG. 3A illustrates an example user interface provided by the testing module 210 in accordance with an aspect of the present disclosure. As shown in FIG. 3A, the user interface 300 allows a user to enter a test data name in field 302. The user interface 300 allows the user to enter an output file name in field 304. The user interface 300 allows the user to enter a delimiter value in field 308 as well as a desired file format in field 306. As shown in FIG. 3A, an add column button 310, when selected by the user, will cause the testing module 210 to add a column. The output file name field 304 allows the user to set a filename for the test profile which will contain the generated test data. The delimiter value field 308 allows the user to set the delimiter value, such as comma or other value. The file format field 306 allows the user to select the format (e.g. CSV) in which the test data results are to be provided.

In an aspect, the user interface 300 allows the user to provide one or more generic input parameter rows. As shown in FIG. 3A, each input parameter row is shown to include a data type input field 312, a content type input field 314, a pattern position input field 316, a content length input field 318, a pattern input field 320, a minimum value input field 322, a maximum value input field 324, a use case data input field 326, an equal partition value input field 328 and a must contain input field 330. Once the user selects the Add Column button 310, the user interface 300 displays an additional input parameter row. It should be noted that any number of input parameter rows are contemplated.

For a given input parameter row, the user provides a generic data type input by selecting one available data type in the data type input field 312. In particular, the user is able to select whether the data type for the particular input parameter row is an integer value, a Boolean value or a string value. In an aspect, the testing module 210 utilizes at least the user selected data type to access an index list (FIG. 3B) and identify one or more applicable algorithms which are ultimately used to generate test data. It is contemplated that the testing module 210 may, in addition to the user specified data type, take into account other inputs shown in FIG. 3A when generating test data.

As shown in FIG. 3A, the content type input field 314 allows the user to provide a name to the particular input parameter row. The data input by the user into the content type input field 314 can be inputted into an insertion field or may be selected from available content type names from a drop down menu. The testing module 210 utilizes the content type input to identify the generated test data in relation to the particular input parameter row.

As shown in FIG. 3A, for a particular input parameter row, the pattern position input field 316 allows the user to select the location or position in a pattern where the test data is to be applied during the testing step. For example, a generated test input would be applied to a left side of a string when the pattern position input field 316 is selected to be "left". Similarly, a generated test input would be applied to a right side of a string when the pattern position input field 316 is selected to be "right".

Regarding the content length input field 318, the user is able to provide the length of characters that are to be considered by the testing module 210 when applying them to the test data generator algorithms. As shown in FIG. 3A, a content length of 10 characters is input by the user in the first input parameter row, whereas a content length of 20 characters is input by the user in the second input parameter row. Accordingly, the testing module 210 will generate test data having 10 characters for the first parameter row and 20 characters for the second parameter row. As shown in FIG. 3A, the third input parameter row does not include content length limiter information in the content length input field 318. Accordingly, the testing module 210 will generate test data having character lengths that are not limited to a particular character size.

For a particular input parameter row, the pattern input field 320 allows the user to specify a particular pattern which the generated test data is to have. For example, as shown in FIG. 3A, the first input parameter row includes a pattern limiter of '222' in the pattern input field 320. Accordingly, for the first input parameter row, the testing module 210 will instruct the testing algorithms to generate integers having content lengths of 10 in which the pattern '222' is located in different consecutive place holdings.

The minimum and maximum input value limiter fields 322, 324 allows the user to specify the minimum and maximum values of the generated input test data. As shown in FIG. 3A, the first parameter row has a limit instruction provided by the user in which the minimum value and the maximum value of the generated test data is 11111 and 11111111111, respectively.

The use case data input field 326 allows the user to insert a specific value that the user wants the testing module 210 to generate test data for. In an aspect, the value inserted in the use case data may or may not fall within the range of characters that the testing module 210 would produce based on one or more limitations that the user had provided. For example, for the first input parameter row, the pattern value of '222' is provided by the user in field 320. However, as shown in FIG. 3A, the user may want a specific value which includes only the pattern '22' to be generated as test data.

The equal partition value input field 328 allows the user to instruct that test values be generated at equal partitions between the minimum and maximum values 322, 324. For example, if the minimum value is 200 and the maximum value is 5000 and the equal partition input field is 200, the generated test values will be 200, 400, 600, 800, etc. As shown in FIG. 3A, the user input a value of 3 in the equal partition value input field 328. Accordingly, the testing module 210 will produce values 11111, 11114, 11117 and so on.

As shown in FIG. 3A, the user interface includes a Must Contain input field 330 which allows the user to input a specific value that one or more of the generated test data must include. In particular to the first input parameter row in FIG. 3A, the must contain input field 330 contains a value of 456123231.

As stated above, the testing module 210 utilizes stored algorithms in the various libraries that are configured to mimic how a person thinks when generating input test data. The stored algorithms are designed to utilize the generic input parameters, and in particular user specified data type information (i.e. integer, string, Boolean) to identify the algorithms which are applicable for generating test data that is ultimately to be used on the target software.

Figure 3B:
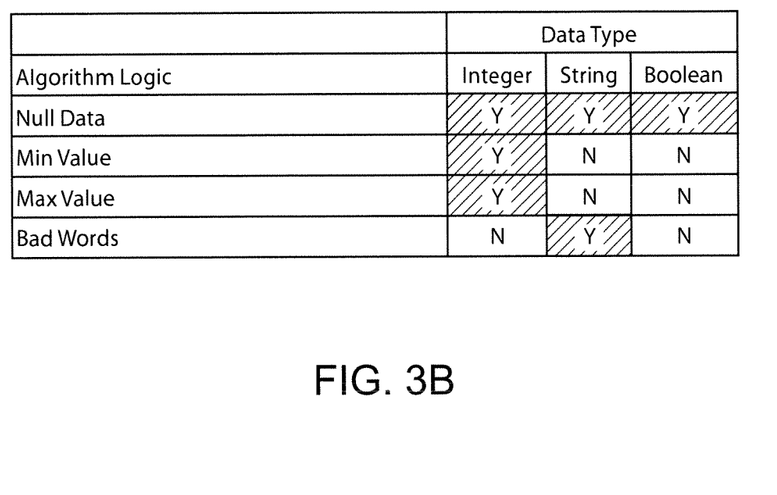
FIG. 3B illustrates a table representing some example index to data types correlations in accordance with an aspect of the present disclosure.

In an aspect, the testing module 210 utilizes an index table or other data structure which correlates the available stored testing algorithms with the data types that are associated with them. FIG. 3B provides an exemplary index list of algorithms and their applicability to the particular data type. In particular, four exemplary algorithms are shown, such as a null data algorithm, a minimum value algorithm, a maximum value algorithm and a bad words algorithm. Each exemplary algorithm, when applied with an applicable input, produces or generates an appropriate test data case. It should be noted that the algorithms shown in FIG. 3B are exemplary and additional/different algorithms are contemplated and stored in a database accessible by the testing module 210.

In the example shown in FIG. 3B, a "Y" indicates the row specified algorithm is applicable to the column specified data type, and an "N" indicates to the contrary. In particular to the data types shown in FIG. 3B, the null data algorithm accepts integer, string, and Boolean data types, as indicated by the "Y", whereas the minimum and maximum value algorithms only accepts the integer data type and not the string and Boolean data types. Further, the bad words algorithm only accepts string based data types in the example. The index data structure shown in FIG. 3B is configured such that all algorithms that are stored in the libraries have mapping information which allows the testing module 210 to correlate which data types are appropriate for use with the specific algorithms. By mapping a correlative index between each algorithm and one or more particular data types, the testing module 210 can broadly identify and select only those test case generating algorithms based sonly on the data type information that the user inputs. This allows the user to input, at the very least, the data type information through the user interface, whereby the testing module 210 will automatically identify the appropriate stored algorithms to use based on the requisite data type in the index.

For example, referring to FIG. 3B, the testing module 210 will automatically select the null data algorithm and the bad words algorithm in response to the user selecting the 'string' data type. In another aspect, the testing module 210 will identify and automatically select the null data, minimum value and maximum value algorithms in response to the user selecting the 'integer' data type. In yet another aspect, the testing module 210 will identify and automatically select only the null data algorithm in response to the user selecting the 'Boolean' data type. It should be noted that additional parameter limitations, as discussed above in FIG. 3A, can be incorporated by the testing module 210 to limit the values that are applied to the selected one or more algorithms.

With regard to the stored algorithms, one or more algorithms that are software engineering driven are stored in a software engineering algorithm library 214. In particular, the algorithms in library 214 are configured to mimic the way an experienced software engineer would come up with new test cases and/or modify existing test cases to be applied as test data inputs to the target software 98. In particular, referred to in FIG. 4, the software engineering driven algorithm library 214 can utilize algorithms which capture testing concepts such as mutation testing, fuzz testing, scalability testing, stress testing, fault injection testing, dependency testing, concurrency testing, and the like.

With regard to the programming domain algorithm library 216, the algorithms in library 216 are configured to mimic the way an experienced programmer would generate new test cases and/or modify existing test cases to be applied to the target software 98. The algorithms in library 216, referred to in FIG. 5, capture testing concepts from the programming language domain, such as boundary value testing, equivalence partitioning testing, keyword/data driven testing, UI testing, interface testing, both positive and negative testing, orthogonal array testing, control flow testing (e.g. exception generators, case/switch statement overflow) and the like.

With regard to the business cases algorithm library 218, the algorithms in library 218 are configured to act as translators of business cases or uses cases that are traditionally provided by a person who is an expert in application domain/business case driven test data inputs. In an aspect, these algorithms do not produce any new test cases, but are specific to a business case are sometimes the most common way to describe the application domain which may specific to the scenario in which the target software is to operate. In an aspect, algorithms can be added to or removed from the business cases algorithm library 218 by an administrator.

The test data generator module 220 of the testing module 210 is configured to take the data type and parameter limiting values provided by the user for a particular input parameter and apply those values to the selected algorithms to produce one or more sets of test case data. In an aspect, each algorithm contains definitions of the input data types (e.g. Boolean, Integer, String) that are supported by that algorithm. In an aspect, each algorithm has an object that contains getters and setters for a parsed control file (e.g. XML control file). Accordingly, once the user completes the configuration in the user interface, the testing module 210 will generate a control file for the configuration.

The combinations generator module 222 communicates with the test data generator module 220 and generates a cross product of the value combinations of the generated test data. For example, the generator module 220 may produce 10 different test data inputs when applying user input values to algorithm A. In the same example, the test data generator module 220 may produce 6 different test data inputs when applying user input values to algorithm B. The combinations generator module 222 will then generate a cross product of 10×6 or 60 different test data inputs.

In addition, as shown in FIG. 2B, the combination generator module 222 can receive configuration information from the user, via the user interface, in which the configuration information may contain user provided parameter information which ultimately affects the results generated by the combination generator module 222.

Figure 2C:
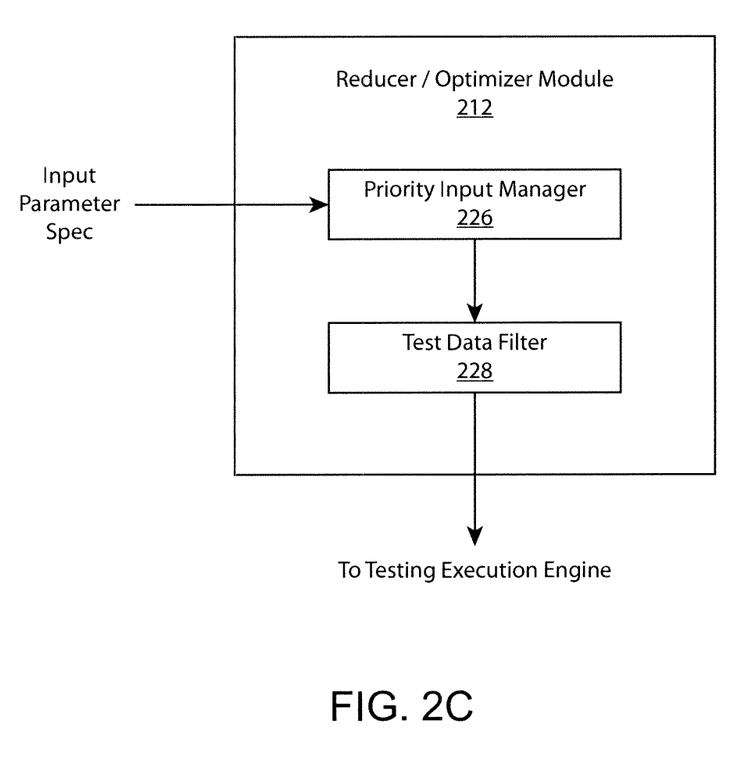
FIG. 2C illustrates a block diagram of the reducer/optimizer module in accordance with an aspect of the present disclosure.

The reducer/optimizer module 224 is configured to receive the results from the combination generator module 222 and reduce and/or optimize the number of test data inputs in a test data set. As shown in FIG. 2C, the reducer/optimizer module 224 may include a priority input manager 226 and a test data filter 228. The priority input manager 226 receives configuration instructions from the user, via the user interface, in which the configuration instructions are associated with input priority related parameters. In an aspect, the input priority related parameters include, but are not limited to, whether a particular parameter field is mandatory or optional; whether the value associated is a "must have' value or not; and/or identification of a subset of data generation algorithms which produce the test data.

In an aspect, the testing module 210 is configured to have extension capabilities to allow it to communicate with a common test execution engine coupled with varying test data input, thereby allowing the generation of new and various test data equivalent to generating new test cases. The testing module's 210 extension capabilities also include generalization from web services API to software on other platforms, such as standalone server platform based, non-web version implementation of peer-to-peer communicating software, non-web version implementation of client-server or distributed software etc. Finally, because both software engineering and programming language based test generation are used, and furthermore because programming language based test generation tend to pry upon the internal structure of the code, it is also possible to view the solution as a partial-White-box test solution as well.

Figure 6:
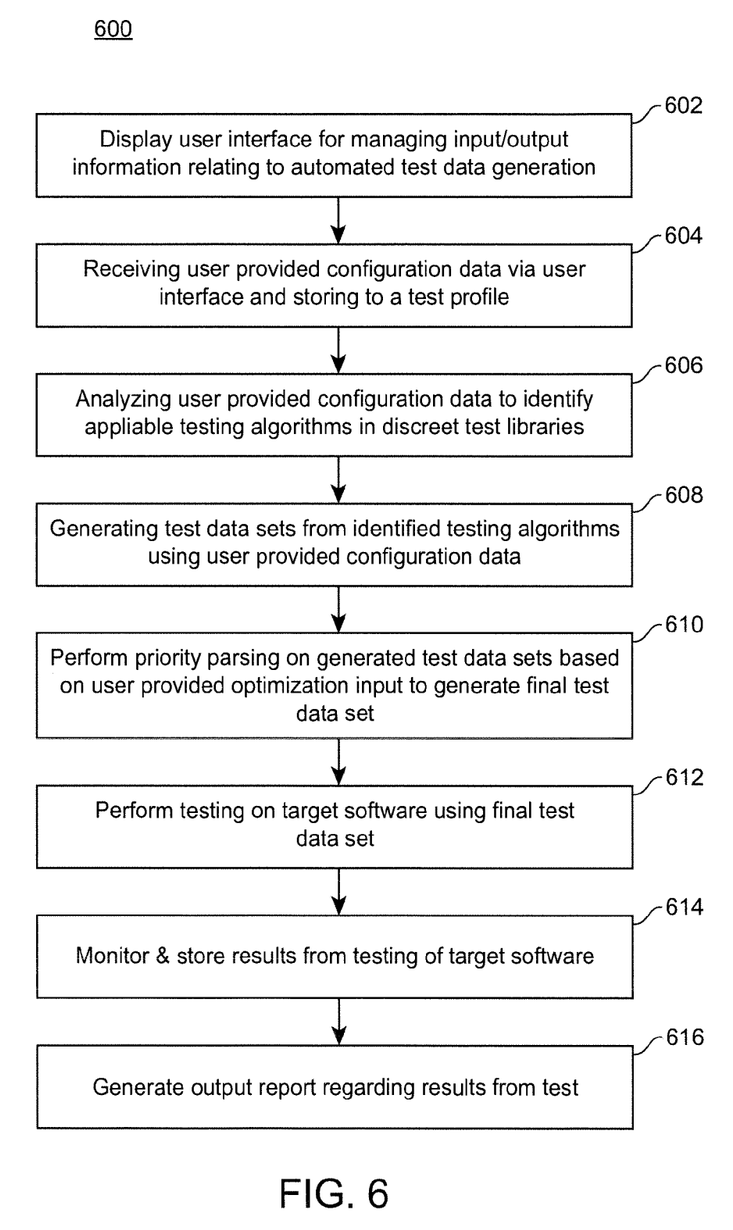
FIG. 6 illustrates a flow chart representing a process performed by the testing module in accordance with an aspect of the present disclosure.

FIG. 6 illustrates a flow chart representing a process performed by the testing module in accordance with an aspect of the present disclosure. As shown in FIG. 6A, the process 600 begins with the testing module 210 displaying a user interface for managing input/output information relating to automated test data generation (Block 602). The testing module 210 receives one or more rows of user provided input parameters via the user interface, wherein the input parameter at least includes data type information, such as integer, Boolean or string information (Block 604). In an aspect, the testing module 210 receives parameter limiting data (discussed in relation to FIG. 3A) and stores it to memory under a user generated test profile.

The testing module 210 thereafter analyzes the user provided data type inputs against an index or other type of data structure to identify one or more algorithms which are to be selected based on the provided data type information (Block 606). In an aspect, one or more additional parameter limitations (FIG. 3A) are utilized by the testing module 210 to limit or apply specific values to the algorithms in generating the test data. (Block 608). The testing module 210 thereafter performs priority parsing on the generated test data sets based on user provided optimization inputs to generate a final test data set (Block 610).

The testing module 210 then sends the final test data set to a testing execution engine, that is integrated with or separate from the testing module 210, to perform testing on the target software (Block 612). The results from the target software are then monitored and stored in a memory (Block 614). The testing module 210 analyzes these results and generates an output report which provides the results from the target software test (Block 616).

In an aspect, the testing module 210 is able to perform an extension of automated test data generation to include automated test case execution. In particular, a test case execution environment can be implemented to the testing module 210 as a set of test scripts that are governed (i.e., ran) by the test data. Accordingly, the testing module 210 is able to perform a test execution step immediately following the test data generation step. The testing module 210 is configured to perform the test execution process using a suite of implemented test scripts (with each such script having input a test data), wherein the testing module 210 utilizes an implemented batch execution engine which triggers the test execution process upon receiving the generated test data. Accordingly, it is contemplated that the testing module 210 can not only automatically generate test data generation but also automatically execute testing of the target software using the generated test data to provide a complete test automation framework.

As stated above, the testing module 210 uses software engineering and programming language-driven algorithms to automatically generate test data. However, these algorithms do not rely on any insight of the internal control and/or data flow structure of the test target software. In other words, the target software is usually treated as a black box prior to and during testing, wherein there may be little opportunity to better understand the data or control flow structure. Accordingly, in an aspect, the testing module 210 is configured to delve deeper into the data and/or control flow structure of the test target software by treating the target software as partially opaque or a gray box. In particular, the testing module 210 may allow an administrator to develop and upload algorithms in the algorithm libraries which specifically target data flow and/or control flow aspects of the target software and specifically identify defects or vulnerabilities in the code related to the data/control flow aspects. For example, the testing module 210 can be configured to reveal one or more If-then-else paths and case or switch statements within the target software's code. Accordingly, the testing module 210 may utilize an uploaded algorithm designed to test boundary values of the case or switch statement, such as whether a switch statement has a default value path. Another algorithm the testing module 210 could utilize would be to test if the If-then-else statement includes proper nesting. The list of programming language based algorithms can greatly benefit from any knowledge of control flow of the internal structure of the test target software.

In an aspect, the testing module 210 may be configured to allow the user, via the user interface, to select or deselect one or more specific algorithms for automated test data generation. For example, the testing module 210 may allow the user to either select or deselect one or more algorithms via the user interface.

Additionally/alternatively, the testing module 210 allows the user to assign a priority value among two or more algorithms via the user interface. In an aspect, the testing module 210 may be configured to automatically assigning priority values to certain algorithms, wherein a particular algorithm is given a higher priority value than others by the testing module 210, itself. Accordingly, the priority value may be adaptively computed by the system (instead of being asked to be provided by the end user) based upon prior usage and effectiveness feedback.

In an aspect, the testing module 210 uses the weighted priority value generation for each test data generation algorithm. If a particular test data generation algorithm is marked ineffective over a period of usage or application instances, the testing module 210 would assign a lower priority value to that algorithm. On the other hand, if the testing module 210 finds that a particular test data generation algorithm is effective (e.g. consistently identifying errors or issues in several different target software) and is used in a sequence of applications, then the testing module 210 would progressively assign it a higher priority level. At any given instant, the generated test data would be ranked per the priority values of the respective algorithms—i.e., an algorithm with a higher priority value would produce test data that are marked higher priority.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for automatically generating test data to be applied to test a target software code, the method comprising:
    receiving, by a testing apparatus, input parameter data from a user via a displayed user interface, wherein the input parameter data is directed to a user selected data type, the data type being a Boolean, string, or integer;
    mapping a correlative index between each of one or more preestablished stored testing algorithms and one or more data types, wherein the one or more data types comprises the user selected data type, and wherein correlation between the one or more preestablished stored testing algorithms and the one or more data types is stored in a data structure;
    selecting, by the testing apparatus, the one or more preestablished stored testing algorithms specific for a business use case solely based on mapping the correlative index;
    applying, by the testing apparatus, one or more values to the selected one or more preestablished stored testing algorithms in accordance with the user selected data type and input parameter data for the user selected data type;
    automatically generating, by the testing apparatus in response to the applying, at least one set of test data from the selected one or more preestablished stored testing algorithms without user intervention, wherein the at least one set of test data generated from the selected preestablished stored testing algorithms can be used as inputs for testing the target software code; and
    generating, by the testing apparatus, a reduced set of test data from the automatically generated at least one set of test data by performing a priority based parsing technique on the automatically generated at least one set of test data based on the received input parameter data for the user selected data type.

2. The method of claim 1, wherein the one or more preestablished stored testing algorithms is associated with software engineering based algorithms.

3. The method of claim 1, wherein the one or more preestablished stored testing algorithms is associated with programming language and construct based algorithms.

4. The method of claim 1, wherein the one or more preestablished stored testing algorithms is associated with application domain and business case based algorithms.

5. The method of claim 1, wherein the at least one set of test data generated by the testing apparatus includes a plurality of sets of test data and wherein the reduced set of test data can be used to test the target software code.

6. The method of claim 5, wherein the input parameter data utilized in the parsing technique identifies whether a particular input parameter is mandatory or optional.

7. The method of claim 5 wherein the input parameter data utilized in the parsing technique indicates that a particular input parameter is to have a required value to be included or removed from the generated sets of test data.

8. A non-transitory machine readable medium having stored thereon instructions for automatically generating test data to be applied to test a target software code, the medium comprising machine executable code which when executed by a processor of a testing apparatus, causes the processor to perform steps comprising:
    receiving input parameter data from a user via a displayed user interface, wherein the input parameter data is directed to a user selected data type, the data type being a Boolean, string, or integer;
    mapping a correlative index between each of one or more preestablished stored testing algorithms and one or more data types, wherein the one or more data types comprises the user selected data type, and wherein correlation between the one or more preestablished stored testing algorithms and the one Or more data types is stored in a data structure;
    selecting the one or more preestablished stored testing algorithms specific for a business use case solely based on mapping the correlative index;
    applying one or more values to the selected one or more preestablished stored testing algorithms in accordance with the user selected data type and input parameter data for the user selected data type;
    automatically generating, in response to the applying, at least one set of test data from the selected one or more preestablished stored testing algorithms without user intervention, wherein the at least one set of test data generated from the selected preestablished stored testing algorithms can be used as inputs for testing the target software code; and
    generating a reduced set of test data from the automatically generated at least one set of test data by performing a priority based parsing technique on the automatically generated at least one set of test data based on the received input parameter data for the user selected data type.

9. The medium of claim 8, wherein the one or more preestablished stored testing algorithms is associated with software engineering based algorithms.

10. The medium of claim 8, wherein the one or more preestablished stored testing algorithms is associated with programming language and construct based algorithms.

11. The medium of claim 8, wherein the one or more preestablished stored testing algorithms is associated with application domain and business case based algorithms.

12. The medium of claim 8, wherein the at least one set of test data generated by the processor of the testing apparatus includes a plurality of sets of test data and wherein the reduced set of test data can be used to test the target software code.

13. The medium of claim 12, wherein the input parameter data utilized in the parsing technique identifies whether a particular input parameter is mandatory or optional.

14. The medium of claim 12, wherein the input parameter data utilized in the parsing technique indicates that a particular input parameter is to have a required value to be included or removed from the generated sets of test data.

15. A testing, apparatus comprising:
a memory having stored thereon executable programmed instructions for automatically generating test data to be applied to test a target software code; and a processor coupled to the memory and configured to execute the programmed instructions which, when executed by the processor, causes the processor to perform steps comprising:
receiving input parameter data from a user via a displayed user interface, wherein the input parameter data is directed to a user selected data type, the data type being a Boolean, string, or integer;
mapping a correlative index between each of one or more preestablished stored testing algorithms and one or more data types, wherein the one or more data types comprises the user selected data type, and wherein correlation between the one or more preestablished stored testing algorithms and the one or more data types is stored in a data structure;
selecting the one or more preestablished stored testing algorithms specific for a business use case solely based on mapping the correlative index;
applying one or more values to the selected one or more preestablished stored testing algorithms in accordance with the user selected data type and input parameter data for the user selected data type;
automatically generating, in response to the applying, at least one set of test data from the selected one or more preestablished stored testing algorithms without user intervention, wherein the at least one set of test data generated from the selected preestablished stored testing algorithms can be used as inputs for testing the target software code; and
generating a reduced set of test data from the automatically generated at east one set of test data by performing a priority based parsing technique on the automatically generated at least one set of test data based on the received input parameter data for the user selected data type.

16. The testing apparatus of claim 15, wherein the one or more preestablished stored testing algorithms is associated with software engineering based algorithms.

17. The testing apparatus of claim 15, wherein the one or more preestablished stored testing algorithms is associated with programming language and construct based algorithms.

18. The testing apparatus of claim 15, wherein the one or more preestablished stored testing algorithms is associated with application domain and business case based algorithms.

19. The testing apparatus of claim 15, wherein the at least one set of test data generated by the processor of the testing apparatus includes a plurality of sets of test data, and wherein the reduced set of test data can be used to test the target software code.

20. The testing apparatus of claim 19, wherein the input parameter data utilized in the parsing technique identifies whether a particular input parameter is mandatory or optional.

21. The testing apparatus of claim 19, wherein the input parameter data utilized in the parsing technique indicates that a particular input parameter is to have a required value to be included or removed from the generated sets of test data.

* * * * *